INVENTOR.
LOUIS A. ROSENTHAL

INVENTOR.
LOUIS A. ROSENTHAL

United States Patent Office 3,116,631
Patented Jan. 7, 1964

3,116,631
APPARATUS FOR MEASURING VISCOSITY OF THERMOPLASTICS
Louis A. Rosenthal, Highland Park, N.J., assignor to Union Carbide Corporation, a corporation of New York
Filed Sept. 1, 1960, Ser. No. 53,520
5 Claims. (Cl. 73—56)

This invention relates to apparatus for measuring the viscosity of thermoplastics. More particularly, this invention relates to apparatus for continuously and automatically measuring the viscosity of a stream of a thermoplastic polymer.

The importance of viscosity measurements for production control has been well established in the manufacture of polymers as the viscosity of a polymer is an indication of the degree of polymerization that has taken place. Stated alternatively, viscosity is an indication of the molecular weight of a polymer which, in turn, determines its chemical and physical properties. An accurate viscosity reading, therefore, allows the manufacturer an opportunity for control of the polymerization reaction as it indicates to the manufacturer to either allow the polymerization reaction to continue, to interrupt the polymerization reaction, or to modify the polymerization reaction, in order to obtain a polymer which has undergone the required degree of polymerization and has the desired molecular weight.

Due to the importance of viscosity measurements, specific tests have been designed for use in determining the viscosity of specific polymers. For instance, the "Extrusion Plastometer" and the "Rossi-Peakes" tests are accepted procedures for determining the viscosity of polystyrene. The "Melt Index" test has almost universally been used for determining the viscosity of polyethylene. ASTM designations for these tests are as follows: Rossi-Peakes, ASTM D569–48; Extrusion Plastometer, ASTM D1238–57T; Melt Index, D1248–58T.

These and other such comparable tests for determining viscosity, however, are designed for manually testing a sample of a polymer at the conclusion of the polymerization reaction. Consequently, the time lag in manually preparing a sample of the finished polymer which is to be used in the viscosity test, testing the sample, interpreting the results of the test and as a result thereof modifying the polymerization reaction, is too great for purposes of accurate production control.

The present invention provides for continuously and automatically measuring the viscosity of thermoplastic polymers at any desired point of the polymerization reaction and eliminates the necessity of manually preparing samples of material for testing, which results in undesirable "time lags" as explained in the preceding paragraph. By the present invention, viscosity of thermoplastic polymers can be determined in the early stages of the polymerization reaction, if so desired, and the viscosity measurements recorded and used as a basis for modifying the polymerization reaction, interrupting it or allowing it to proceed unchanged.

According to the present invention, a uniform and constant volumetric flow of a thermoplastic polymer, maintained at a substantially constant temperature, is passed into and discharged from a distortable conduit or tube which has a constricted discharge orifice. As the thermoplastic polymer passes through the distortable tube, its flow is constricted at the discharge orifice resulting in the development of a pressure in the tube which will cause the tube to deflect. The amount of deflection of the tube is measured and the deflection reading translated to a viscosity measurement.

Advantages of this invention are readily apparent from the following description and from the accompanying drawings wherein there is depicted one embodiment of an apparatus according to the present invention and in which.

Figure 1:
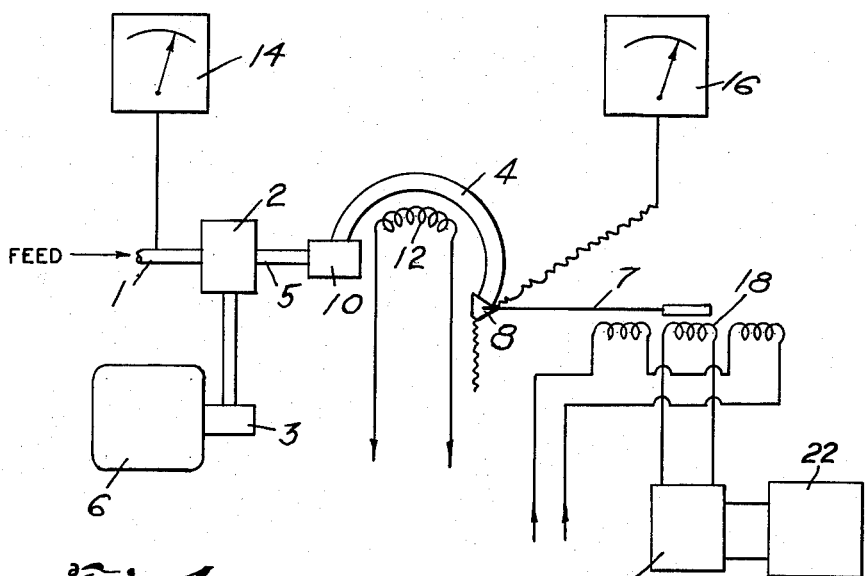
FIGURE 1 is a diagrammatic drawing of one arrangement of an apparatus which is suitable for purposes of carrying out the present invention.

Referring now to FIGURE 1, a thermoplastic material in its melt state, that is in a state in which the behavior of the thermoplastic is that of a viscous liquid, is withdrawn from a source (not shown) and fed by convenient means (not shown) through conduit 1 into volumetric metering pump 2. It is generally convenient to tap the main polymerization stream and feed the hot thermoplastic polymer directly into volumetric metering pump 2. In those instances wherein the thermoplastic polymer is not in the melt state, it is usually fed into a mill (not shown) such as a two-roll mill or an extruder (not shown) and milled until it is brought into its melt state and then fed into volumetric metering pump 2.

Sufficient material is fed into volumetric metering pump 2 so that pump 2 delivers to distortable tube 4, which follows pump 2, its theoretical volumetric displacement, that is, delivers that volumetric amount of material per unit of time for which it is rated at the particular speed and at the delivery pressure at which it is operating. Volumetric metering pumup 2 can be driven by any suitable means, as for example, by a motor 6, which can be either a variable speed motor or a constant speed motor, through an appropriate gear train designated by numeral 3.

With volumetric metering pump 2 delivering its theoretical volumetric displacement, a constant and uniform volumetric flow of material is fed into distortable tube 4 from pump 2 through conduit 5 and mounting 10 and discharged from distortable tube 4 through its constricted discharge tip 8.

Distortable tube 4 is fixed in space and connected to conduit 5 by being positioned on mounting 10, which is generally a metal block, having an inlet attached to conduit 5 and an outlet attached to distortable tube 4. The configuration of the inlet and outlet of mounting 10 is such as will provide a smooth flow of material from conduit 5 into distortable tube 4. Generally outlet of mounting 10 is perpendicular to the inlet thereof.

Temperature of the thermoplastic as it passes through distortable tube 4 is controlled and maintained at the desired value by providing heating means at the volumetric metering pump 2 and also at the distortable tube 4. For instance, the volumetric metering pump 2 is usually mounted on a heavy thermostatically controlled block (not shown) so that the temperature of the thermoplastic as it is being pumped through volumetric metering pump 2 is adjusted to the desired value. Temperature of the thermoplastic is maintained at the desired value as it passes through distortable tube 4 by the use of heaters positioned around distortable tube 4. In the arrangement shown in FIGURE 1, distortable tube 4 is sandwiched between heater 12 and its counterpart (not shown).

Thermocouples (not shown) mounted in conduit 1 and in discharge tip 8 of distortable tube 4 are conveniently used to determine the temperature of the thermoplastic prior to its entering distortable tube 4 and just prior to discharging from discharge tip 8. The thermocouples in conduit 1 and in discharge tip 8 are connected to temperature gauges 14 and 16 respectively, the gauges giving a reading of the temperature of the thermoplastic. If desired, a thermocouple can be placed in conduit 5, intermediate volumetric metering pump 2 and distortable tube 4 and connected to a temperature gauge, as a supplement or complement for the thermocouple across conduit 1. In the arrangement shown in FIGURE 1, the temperature of the thermoplastic, as indicated by temperature gauges 14 and 16, will determine the amount of heat that will be necessary to be imparted to the thermoplastic through heating block (not shown) of volumetric metering pump 2 and through heater 12 and its counterpart (not shown) in order to maintain the temperature of the thermoplastic which is passing through distortable tube 4 substantially constant and at the desired value.

Figure 2:
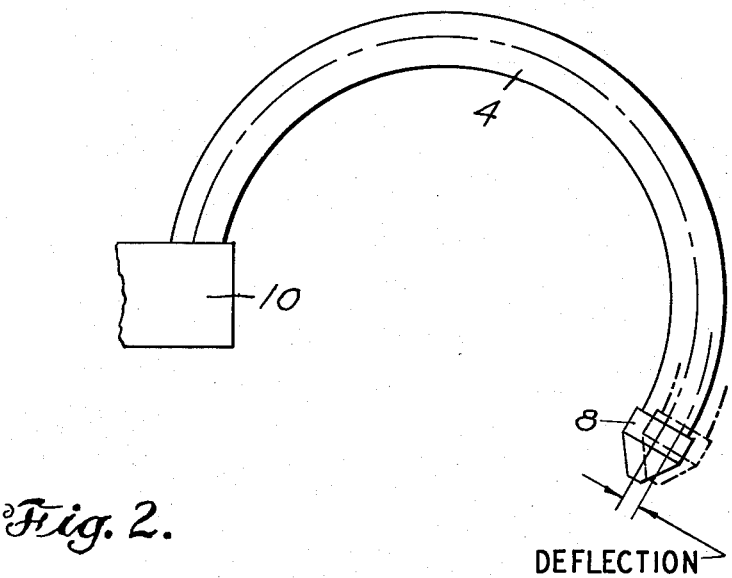
FIGURE 2 is an enlarged view in elevation of the distortable tube identified by numeral 4 in FIGURE 1.

Distortable tube 4 and its constricted discharge tip 8 can be of any size and shape provided that the tube will deflect, under the pressure developed by the passage therein of the thermoplastic whose viscosity is being determined, generally an amount not substantially greater than 200 mils. Deflections greater than about 200 mils tend to result in non-linear tube deflections and may cause permanent strains in the distortable tube. Tube 4 and its discharge tip 8 are generally made of metal, preferably non-corrodible metal having a low coefficient of expansion so that any deflection of the distortable tube 4 will be due to the pressure developed in the tube and not to any thermal deflection. As a practical matter, distortable tube 4 and its discharge tip 8 are of a size and shape and made of a material as will provide a mechanical deflection at the discharge tip 8 of at least about 100 mils, preferably from about 100 to about 200 mils. It is preferred to use a distortable tube which is curved as shown in FIGURES 1 and 2. A curved tube, as shown, has a tendency to straighten out under pressure magnifying the amount of its deflection. The cross section of the tube can also be of any configuration, as for example, circular or elliptical.

It is also preferred to measure the amount of deflection of the distortable tube at its discharge tip. The relatively large pressure drop across the tip of the tube magnifies the deflection of the tube at this point thus allowing the deflection of the tube to be more readily determined.

By maintaining a uniform and constant volumetric flow of thermoplastic material through distortable tube 4 and maintaining the temperature of the thermoplastic substantially constant, the static pressure head developed in the tube will cause the tube to deflect. This mechanical deflection is measured and translated to a viscosity reading. The reading indicates viscosity at a constant shear strain, that is viscosity at a constant shear rate. Shear rate can be described as the velocity gradient of the material.

As a convenient means of measuring the amount of deflection of distortable tube 4, discharge tip 8 is provided with a pin (not shown), commonly referred to as a pivot point, which protrudes outwardly from its exterior surface and is connected to a linear differential transformer 18 through a mechanical linkage which is designated as numeral 7 in FIGURE 1. The mechanical deflection of discharge tip 8, shown more clearly in FIGURE 2, is determined by mechanical linkage 7 and is converted to an electrical signal by linear differential transformer 18. The electrical output of linear differential transformer 18 is rectified from an A.C. electrical signal to a D.C. electrical signal by rectifier 20 and applied to a voltmeter recorder 22 which may be, for example, a commercial D.C. voltmeter recorder such as a millivolt recorder manufactured by the Brown Instrument Recorder Co., a division of Minneapolis-Honeywell Corp.

The electrical signal or output can be calibrated against viscosity readings obtained by tests such as the Extrusion Plastometer test or the Melt Index test or the recorded electrical output can be used as an indication of viscosity changes.

The viscosity of any thermoplastic polymer can be determined by the present invention. Illustrative of thermoplastic polymers are the following: polystyrene, copolymer of styrene and acrylonitrile, polyethylene, polypropylene, polyvinyl chloride, copolymers of vinyl chloride such as a vinyl chloride-vinyl acetate copolymer. The thermoplastics can contain any of the useful modifiers such as pigments, rubber and the like.

Using an apparatus having the arrangement shown in FIGURE 1, molten thermoplastic material was fed into a Zenith volumetric metering pump from a conventional extruder wherein the material was milled and from which the milled material was extruded in the melt state. The Zenith volumetric metering pump delivered 0.3 cc. of material per revolution and was driven at approximately 9 revolutions per minute by a ¼ horsepower gear-head motor, which operated at 36 revolutions per minute, through a 4-1 gear train reduction unit. Under the operating conditions described in the preceding sentence, the Zenith pump had a flow output of 2.7 cc. of material per minute. 2.7 cc. of molten material per minute were continuously pumped by the Zenith pump into a 600 lb. stainless steel Bourdon tube which had a length of 7.5 inches and was curved into about 240° of a 3-inch diameter circle. The distortable tube had a cross section which was nearly elliptical with a major diameter of ⅝ of an inch and a minor diameter of ⁵⁄₁₆ of an inch. Two flat pancake heaters sandwiched the distortable tube and provided sufficient heat to maintain the temperature of the material at 175° C. as it passed through the distortable tube. The temperature of the material just prior to its entering the distortable tube and at the discharge tip of the distortable tube was measured and indicated by thermocouple and gauge assemblies as shown in FIGURE 1.

The distortable tube at its inlet end was mounted in a metal, transition fitting which allowed for the smooth transmission of material into the distortable tube from the conduit which connected the distortable tube and the Zenith pump. The fitting also fixed the distortable tube in space. At the discharge end of the distortable tube there was welded a discharge tip which had an opening of 0.067 inch in diameter. A pin extended from an exterior surface of the discharge tip and was connected through a mechanical linkage, a metal rod, to the travelling metal core of a linear differential transformer which excited at 60 cycles per second and had a linear core travel of 200 mils. The mechanical deflection of the distortable tube at its tip was determined by the mechanical linkage and converted to an electrical signal by the linear differential transformer. The electrical output of the linear differential transformer was rectified by a conventional rectifier and applied to a 10 millivolt recorder.

With an arrangement as described, three molten compositions, composition A, composition B and composition C were fed through the apparatus at specific intervals. Composition A contained a white pigment, mineral oil and a polystyrene having a molecular weight of about 48,000. Composition A had an Extrusion Plastometer value of about 950. Composition B, the most highly viscous of the compositions, contained a pink pigment and a polystyrene having a molecular weight of about 57,000. Composition B had an Extrusion Plastometer value of about 190. Composition C, which was more viscous than composition A but less viscous than composition B, contained a brown pigment and a polystyrene having a molecular weight of about 48,000 and had an Extrusion Plastometer value of about 550.

The compositions were fed into the apparatus according to the following schedule starting with composition A.

Figure 3:
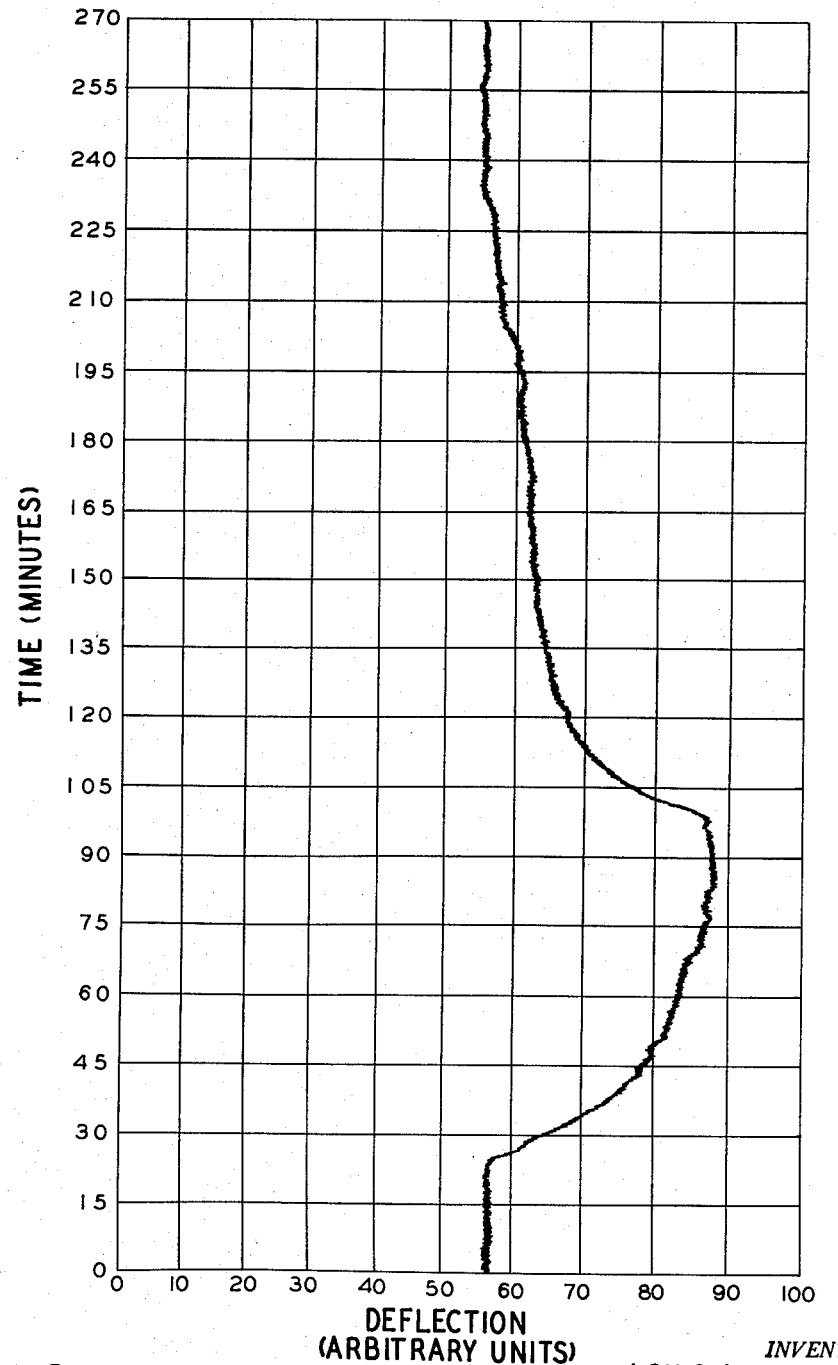
FIGURE 3 is a graph showing recorded changes in the amount of deflection of tube 4 occasioned by passing various thermoplastics therethrough.

(1) Composition A
(2) After about 27 minutes, composition B
(3) After about 95 minutes, composition C
(4) After about 230 minutes, composition A As the compositions were being passed through the distortable tube at a temperature of 175° C., the mechanical deflection of the distortable tube was converted to electrical signals and these signals automatically and continuously recorded. FIGURE 3 shows these recordings.

Recordings shown in FIGURE 3 indicate the relative viscosities of the compositions which were being tested indicating that the more viscous the composition the greater the mechanical deflection of the distortable tube.

Molecular weight values noted herein were determined by the well-known Staudinger measurement.

Extrusion Plastometer values noted herein were determined by ASTM procedure D1238–57T.

What is claimed is:

1. Apparatus suitable for making viscosity measurements comprising a distortable tube having a constricted discharge orifice, means for maintaining a uniform and constant volumetric flow of material through said distortable tube whereby a static pressure head is developed within said distortable tube, means for measuring mechanical deflection of said distortable tube caused by said static pressure head while maintaining the temperature of said material substantially constant and means for converting said mechanical deflection to a signal representative of viscosity of said material.

2. Apparatus suitable for making viscosity measurements comprising a distortable tube having a constricted discharge orifice, means for maintaining a uniform and constant volumetric flow of material at a substantially constant temperature through said distortable tube whereby a static pressure head is developed within said distortable tube which causes said distortable tube to mechanically deflect, and means for converting said mechanical deflection to an electrical signal having an amplitude proportional to viscosity of said material.

3. Apparatus suitable for making viscosity measurements comprising a distortable tube having a constricted discharge orifice, a volumetric metering pump for maintaining a uniform and constant volumetric flow of material through said distortable tube whereby a static pressure head is developed within said distortable tube which causes said distortable tube to mechanically deflect, means for maintaining said material at a substantially constant temperature as it passes through said distortable tube, a linear differential transformer mechanically linked to said distortable tube for converting said mechanical deflection to an electrical signal having an amplitude proportional to viscosity of said material, and means to record said electrical signal.

4. Apparatus suitable for making viscosity measurements comprising a distortable tube having a constricted discharge orifice, a volumetric metering pump for maintaining a uniform and constant volumetric flow of material through said distortable tube whereby a static pressure head is developed within said distortable tube which causes said distortable tube to mechanically deflect, means for maintaining the temperature of said material substantially constant as said material passes through said distortable tube, a linear differential transformer mechanicaly linked to the discharge orifice of said distortable tube for converting said mechanical deflection to an electrical signal having an amplitude proportional to viscosity of said material, a rectifier connected to said linear differential transformer for rectifying said electrical signal and means to record said rectified electrical signal.

5. Apparatus suitable for making viscosity measurements comprising a curved distortable tube having a constricted discharge orifice, a volumetric metering pump for maintaining a uniform and constant volumetric flow of material through said distortable tube whereby a static pressure head is developed within said distortable tube which causes said distortable tube to mechanically deflect, means for maintaining the temperature of said material substantially constant as said material passes through said distortable tube, a linear differential transformer mechanically linked to the discharge orifice of said distortable tube for converting said mechanical deflection to an electrical signal having an amplitude proportional to viscosity of said material, a rectifier connected to said linear differential transformer for rectifying said electrical signal and a voltmeter connected to said rectifier for recording said rectified electrical signal.

References Cited in the file of this patent
UNITED STATES PATENTS

| | | |
|---|---|---|
| 2,314,991 | Knauth | Mar. 30, 1943 |
| 2,322,814 | Binckley | June 29, 1943 |
| 2,592,569 | Henderson | Apr. 15, 1952 |
| 2,885,611 | Macgeorge | May 5, 1959 |
| 2,897,672 | Glasbrenner et al. | Aug. 4, 1959 |